United States Patent [19]

Castiglione et al.

[11] Patent Number: 4,642,882
[45] Date of Patent: Feb. 17, 1987

[54] METHOD OF MAKING A LAMINATED STATOR

[75] Inventors: Ralph M. Castiglione, Gloversville; Ralph Hurst, Clifton Park, both of N.Y.

[73] Assignee: Mechanical Technology Incorporated, Latham, N.Y.

[21] Appl. No.: 767,905

[22] Filed: Aug. 21, 1985

[51] Int. Cl.⁴ .......................................... H02K 15/06
[52] U.S. Cl. ......................................... 29/596; 29/606; 310/12
[58] Field of Search ..................... 29/596, 606; 310/42, 310/12-14

[56] References Cited

U.S. PATENT DOCUMENTS 2,607,816  8/1952  Ryder et al. ........................... 29/596

Primary Examiner—Carl E. Hall
Attorney, Agent, or Firm—Joseph V. Claeys

[57] ABSTRACT

A method of making a laminated stator assembly for a dynamoelectric machine which comprises machining an inner stator member as a single detail having a plurality of winding retaining grooves and plurality of radial slots all of which terminate at or near a central core portion of the stator member. The material between the radial slots form spaced apart radially tapered sections which terminate in the central core portion and the stator member can serve as its own winding mandrel for winding coils in place in the grooves. After such winding an outer shell of magnetic material is fitted over the inner stator member. The coils, spaces between the radially tapered sections, and surfaces of the groove are provided with suitable, electrically insulating bonding material which after curing bonds such elements into a single unit. The central core portion is then machined away so that there is longer a direct connection between the interior ends of the tapered sections and the stator member.

3 Claims, 6 Drawing Figures

METHOD OF MAKING A LAMINATED STATOR

BACKGROUND OF THE INVENTION

1. Field of the Invention

This invention relates to linear electromagnetic machines such as linear motors, electrodynamic actuators, alternators and the like, and more particularly to a new and improved cylindrical laminated stator assembly for such machines and a new and improved method of making the same.

2. Description of the Related Art

Known prior art linear electrodynamic reciprocating machines include an outer stator surrounding an inner armature which reciprocates therein. A major problem in achieving efficient operation in such linear machines is optimizing the flux pattern and minimizing the eddy current losses in the stator. Eddy currents result in energy losses through undesired heat generation and aberrations in the magnetic flux. To reduce this problem, stators and armatures are of laminate construction which subdivide the electromagnetic forces such that the flux flows in smooth paths in planes parallel to the laminations.

A cylindrical construction is a preferred configuration for a linear electrodynamic reciprocating machines since it provides a uniform air gap between the stator and armature. The stator member of such a device usually includes a plurality of axially extending laminations, whose inner edges define a hollow cylindrical bore in which the armature reciprocates, and at least one circumferentially wound toroid-shaped coil.

Previously constructed cylindrical laminated stators for such machines are characterized by non-uniform laminations and variations in their spacing and alignment. For example, the flat laminations of U.S. Pat. Nos. 3,828,211 and 4,206,373 are deformed at their outer edges in an attempt to produce a tighter pack at both the inner and outer circumference. However, those configurations necessitates the use of assembly jigs, complex forming dies and undue working of the electrical grade iron used in the stator laminations. Tapered spacers have also been used between flat laminations, but it is difficult to insure a uniform arrangement at both the inner and outer circumference. An involute lamination construction, as described in U.S. Pat. No. 3,543,061 for example, has provided some improvement in the spatial and operating characteristics of laminated electromagnetic devices, yet still involves complex fabrication.

Furthermore, once the laminations are fixed together to form a stator assembly and removed from the assembly jig, a coil may still have to be throw-wound into the annular channels opening into the bore of the stator assembly.

All of the above previous manufacturing techniques are imprecise, non-uniform and very complex especially when a large number of laminations are desirable to reduce eddy current losses and produce higher efficiencies. The construction become especially difficult for miniature linear motors where, for example, the stator bore may be less than 0.5 inches in diameter and a plurality of coils are to be wound in the stator formed by the laminations.

SUMMARY OF THE INVENTION

It is accordingly a primary object of the present invention to provide a simple, precise, and reliable laminated stator assembly for a linear electrodynamic machine and a method of making the same.

It is a further object of the invention to provide a laminated stator assembly and method of making the same which is especially advantageous in constructing machines having very small dimensions and which is simple, precise, economical and reliable.

The present invention is simple because the coil is wound in the stator assembly from the outside rather than throw-wound to the inside. The invention is precise in that the laminations are cut uniformly from a single cylindrical stator member and held in place by a core portion which is removed only after the laminations have been bonded in place. The invention is reliable in that the coil is electrically insulated from the stator metal. The invention is economical in that no elaborate fabricating means are required for either full size machines or miniature machines.

These objects are achieved in one embodiment of the present invention which includes the steps of providing an appropriately machined cylindrical stator member having radial slots that define tapered laminations and circumferential grooves for a toroid-shaped coil. A continuous wire is wound from the outside into the insulated circumferential grooves, which is then passed between adjacent grooves in an insulated wireway. A stator shell is fitted over the stator member, and a bonding material is injected into the voids in the stator assembly. The bonding material is then suitably cured such that the tapered laminations are bonded together. A center bore is formed in the stator such that the laminations are separated by the bonding material.

BRIEF DESCRIPTION OF THE DRAWINGS

The invention and its many attendant objects and advantages, will become better understood upon reading the following detailed description of a preferred embodiment in conjunction with the following drawings, wherein.

DESCRIPTION OF PREFERRED EMBODIMENT

Figure 1:
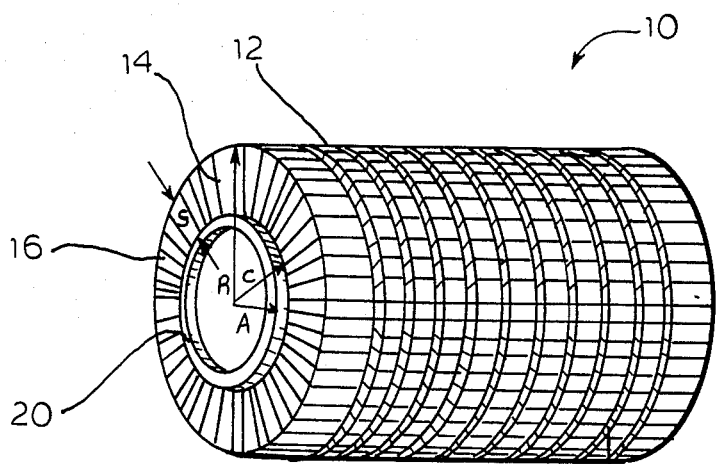
FIG. 1 is a perspective view of a stator member.

Turning now to the drawings wherein like reference numerals designate identical or corresponding parts, and more particularly to FIG. 1 thereof, a cylindrical stator member 10 is shown. The cylindrical stator member may initially be a solid cylinder or hollow cylinder as shown. The stator member consists of a magnetic material preferably having high permeability, high saturation flux density, and high resistivity, such as a silicon steel. The stator member has an outer periphery 12 defined by a cylinder of an appropriate radius R. A plurality of uniformly spaced, axially extending radial slots 14 are machined into the cylindrical stator member 10 by any suitable precision machining process, such as electro-discharge machining (EDM). The radial slots 14 have a preselected radial depth S, which is less than radius R and a predetermined circumferential width. The metal material between the axially extending radial slots 14 forms radially tapered laminations 16 on the stator member. Since the radial slots extend to a preselected depth S which is less than the radius R of the cylindrical stator member, a cylindrical core portion 20 of radius C remains. The core portion thus joins the tapered laminations in the center of the stator member after the radial slots have been machined. The core portion 20 may be provided with an initial manufacturing bore of a radius A, which is less than radius C as shown in FIG. 1 or may be a solid cylinder. The manufacturing bore allows for easier fabrication.

A plurality of uniformly spaced circumferential grooves 30 are also machined into the cylindrical stator member 10. The grooves have a suitable axial cross section. The preselected radial depth G of the circumferential grooves 30 (shown in FIG. 2) is substantially equal to the preselected radial depth S of radial slots 14. The preselected depth G of the circumferential grooves is also less than the radius R of the cylindrical stator member. Thus the core portion 20 also joins the cylindrical sections between adjacent circumferential grooves. Preferably, an even number of circumferential grooves are provided for electrical balance.

Figure 2:
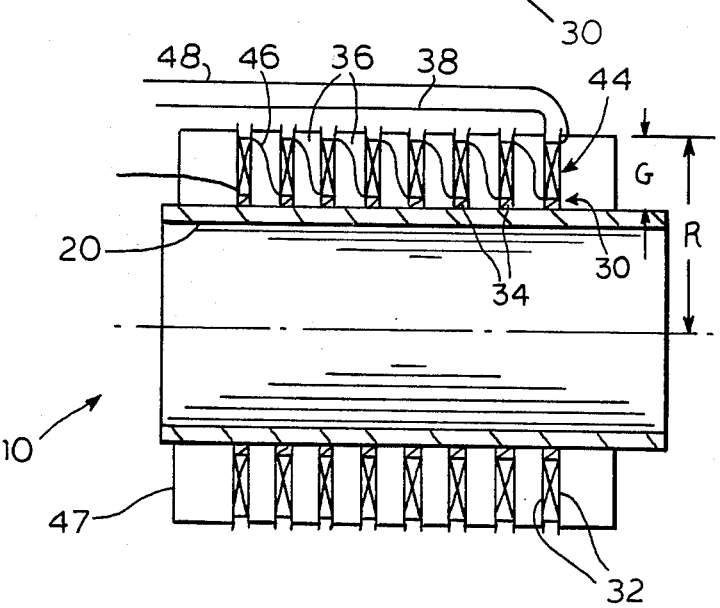
FIG. 2 is a sectional view of the stator member with a coil wound in place.
Figure 5A:
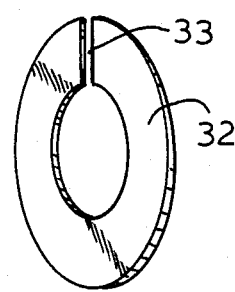
FIGS. 5A and 5B are detailed views of elements in FIG. 2.

FIG. 2 shows stator member 10 in a sectional view taken along two of the radial slots 14. The cross section of the circumferential grooves 30 appears in FIG. 2 as rectangular openings in the stator member 10 although other suitable cross-sectional shapes may be used. A layer of electrically insulating material is provided on all the surfaces of the circumferential grooves 30. A preferred method of providing the electrically insulating material in the groove is to first provide an electrically insulating material layer for each wall of the grooves. As shown in FIGS. 2 and 5A, the electrically insulating wall material 32 may be a disc of 0.001 inch thick plastic film. Each disc is cut once at 33 as shown in FIG. 5A. Then two discs are placed over the circular core portion 20 and into position in each circumferential groove 30. The two discs 32 in each groove abut separate groove walls. The insulating layer may also be provided by other processes that result in a uniform thickness, such as by spraying or coating with a plastic resin.

Figure 5B:
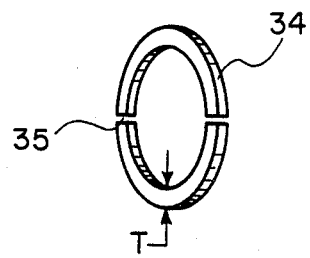

Next, or concurrently, an electrically insulating material layer is provided on the bottom of each circumferential groove 30, such as by the epoxy glass rings 34 as shown in FIGS. 2 and 5b. The ring is machined to the proper inner radius (radius R minus radius G) to completely cover the bottom of the circumferential groove. The ring is cut at 35 and placed in the groove 30 without any overlap. The ring is of the same predetermined axial width as the groove bottom so as to completely cover the bottom of the groove. The ring is of an appropriate thickness T to allow some later machining on the radially inner surface without exposing the wire that will be positioned radially outward in the grooves 30. This insulating layer 34 may also be provided by other coating or spraying processes that result in a uniform thickness.

One of the axially extending radial slots 14 is selected to function as a wireway and has been designated 46 in FIG. 2. The wireway 46 extends between the outside ends of the stator member and each adjacent circumferential groove 30. All the surfaces of the wireway are electrically insulated. If electrically insulating discs 32 are used, the single cuts 33 in each disc 32 (that allows the discs to be placed over the core 20 and into position in the circumferential grooves 30) are aligned to coincide with the axially extending radial slot that forms the wireway 46. An electrically insulating material is provide on all the surfaces of the wireway, such as by spraying or by inserting a folded piece of plastic film into the wireway 46. The fold of the inserted film is positioned along the bottom of the wireway such that the film passes through the aligned cuts 33 and covers the sides of the wireway.

A continuous, insulated magnetic wire such as a varnished wire is started through the wireway from a selected outside end 47 of the stator member to the first circumferential groove 30. The starting portion of the continuous wire is shown in FIG. 2 by the wire portion labeled 42. The continuous wire 40 is wound a predetermined number of turns in each of the circumferential grooves. The wire is wound in each circumferential groove from the outside for a desired number of turns to form a suitable coil 44. After a toroid-shaped coil has been thus formed in the first circumferential groove, the continuous wire is passed through the wireway 46 to the next adjacent circumferential groove where it is again wound a predetermined number of turns to form a second coil 44. In one particular embodiment, the coil includes 67 turns and the turns in adjacent circumferential grooves are made in alternating directions. The continuous wire 40 is passed from the top of the resulting toroid-shaped coil 44 in each circumferential groove through the insulated wireway 46 to the bottom of the next circumferential groove. The sequence of passing the continuous wire 40 through the wireway 46 and winding the wire in the circumferential grooves 30 continues until the desired coil 44 is formed in each circumferential groove 30 of the stator member 10.

As so far described the ends of the continuous wire 40 that forms the coil 44 are at opposite ends of the wireway 46, and may be connected to a suitable source of electrical energy. However, it may be desirable to have both ends of the wire at the same end of the wireway and this is readily accomplished by passing the end of the wire back through the wireway 46.

For example, after the coil 44 has been formed in each groove, a second layer 38 of insulating material is provided in the wireway 46. The finishing end 48 of the continuous wire is passed from the last circumferential groove 30 back through the wireway 46 to the selected end 47 of the stator. This places the finishing end 48 near the starting end 42 of the continuous wire and allows for connection of both ends to a suitable source of electrical energy. A preferred way of providing a second insulating layer 38 in the wireway 46 is to provide a thin electrically insulating tube through which the finishing end 48 of the wire is passed.

After the desired coil 44 has been formed in each circumferential groove 30, the integrity of the circuit can be checked for any electrical shorts. Testing for shorts at each stage of manufacture avoids costly rework or scrapping of a defective stator. Winding from the outside to form the coil in each circumferential groove allows a wider variety of coil configurations, provides better coil winding consistency and higher winding packing factors than prior manufacturing methods.

Figure 3:
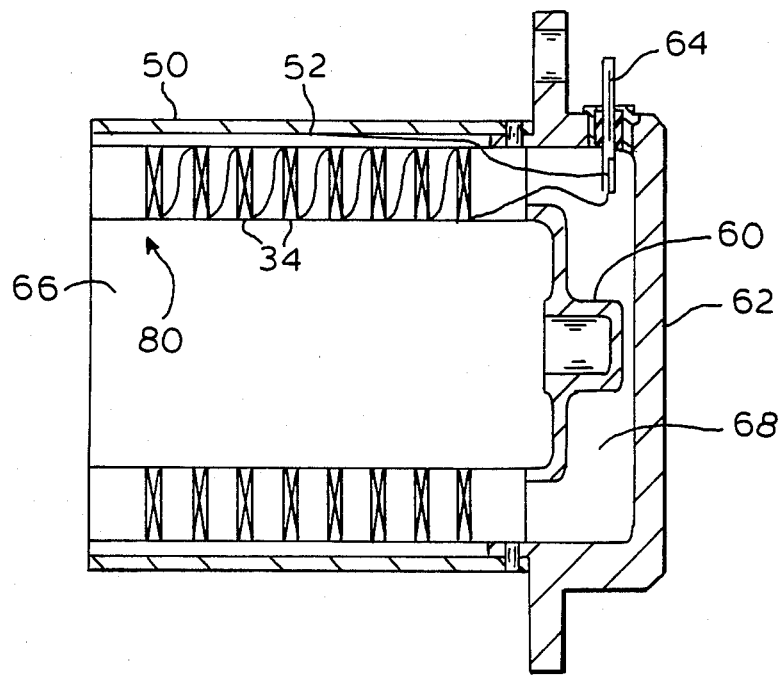
FIG. 3 is a sectional view of the stator member fitted with the stator shell and end pieces.
Figure 4:
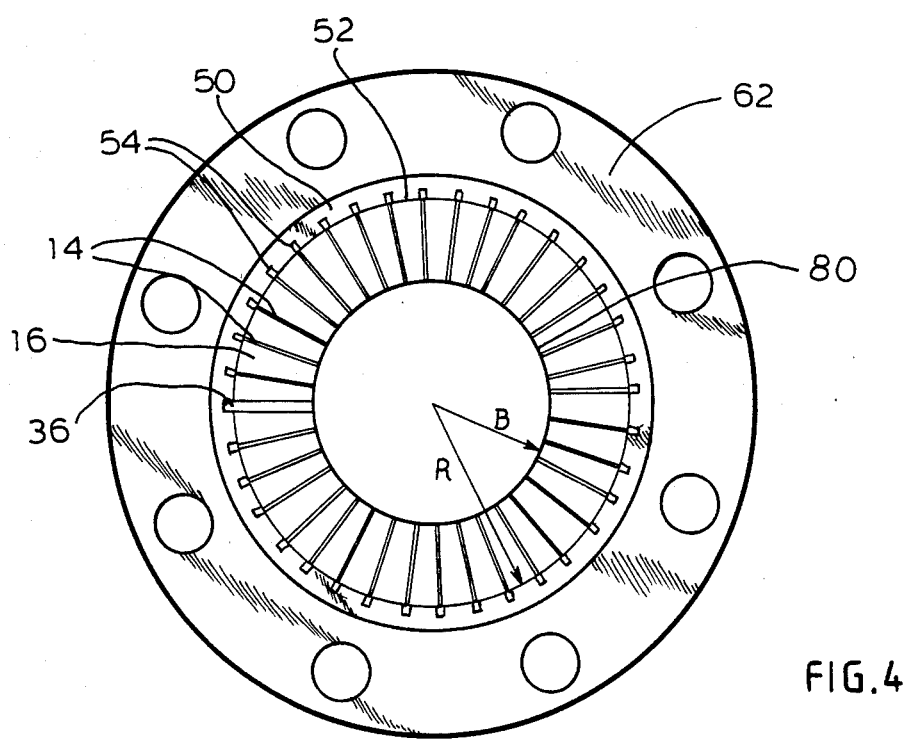
FIG. 4 is an end view of FIG. 3.

As shown in FIGS. 3 and 4, a cylindrical stator shell 50 has an appropriate inner dimension, R, adapted to fit tightly over the outer periphery 12 of the stator member 10. As shown in FIG. 4, the inner dimension surface 52 of the stator shell has axially extending radial slots 54 with the same spacing as the radial slots 14 on the outer periphery of the stator member 10. The slots 54 have a small depth and are machined by any precision method such as EDM. The stator shell 50 is fitted over the stator member 10 to hold the laminations 16 in radial compression and to provide a suitable magnetic flux path. As shown, the radial slots 14 in the stator member 10 are aligned with the radial slots 54 in the stator shell 50.

One suitable method of magnetically separating the laminations 16 is by providing a bonding material having insulating properties in the radial slots 14 and 54 in the stator assembly. An uncured bonding material 70 such as an unfilled epoxy resin having magnetic insulating properties is injected through radial slots 54 in the stator shell 50. The uncured epoxy flows axially through all the slots 54 and flows radially inward from these slots to the aligned radial slots 14 in the stator member 10. The uncured epoxy material 70 also flows into the circumferential grooves 30 and permeates between the wires in coils 44.

The bonding material 70 in the stator assembly is then suitably cured such as by an air curing process or a heat treatment process that will not impair any of the properties of the other insulating materials.

Another method of accomplishing magnetic separation is in a vacuum. The vacuum condition insures that all of the small voids in the stator assembly including the radial slots 14 and circumferential grooves 30 will be completely filled as the bonding material is drawn into the voids.

The use of a vacuum condition is not a significant extra step in the manufacture since it may be desirable in some linear reciprocating machines to have a hermetically sealed assembly. Thus in one embodiment, as shown in FIG. 3, one end of the partially completed cylindrical stator assembly is sealed with appropriate air tight end caps. The open end may then be affixed to appropriate sealing and evacuating means to create a vacuum in the interior of the stator assembly. The bonding material can then be drawn into the stator assembly voids. Even if the stator assembly is not desired to be hermetically sealed, both ends could be affixed to appropriate temporary sealing and evacuating means. Also the bonding material could simply be injected without the benefit of a vacuum as previously described. The exact method used depends on the sizes, materials and desired results.

More specifically, in one embodiment resulting in a hermetic sealed assembly shown in FIG. 3, an inner bore seal cap 60 is adapted to tightly fit on the selected end 37 of the stator assembly so as to form an inner diameter seal. An outer motor end cap 62 is adapted to fit axially outside of the inner bore seal cap 60 and seal the outer diameter of the stator assembly. Preferably the outer motor cap 62 is placed on the selected end 37 of the stator assembly wherein the starting wire 42 and finishing wire 48 are located so that the wires are passed out of the sealed assembly through wire outlet 64. The various joints between the stator assembly, the inner bore seal cap 60, the outer motor end cap 62 and the gaps in the wire outlet 64 are filled with a sealing material to provide an air tight seal. The open end 66 of the stator assembly is adpated to fit a vacuum device (not shown) and the air cavities inside the sealed stator assembly are evacuated.

The uncured bonding material 70 is drawn into all of the voids in the stator assembly by the vacuum device. This process insures that all of the small voids in the stator assembly including radial slots 14, the circumferential grooves 30 and the end space between inner bore seal cap 60 and the outer motor cap end 62 (designated as end space 68 in FIG. 3) will be completely filled. The uncured epoxy resin 70 is drawn axially through radial slots 54 in the stator shell 50 and flows radially inward from these slots to the aligned radial slots 14 in the stator member 10. The uncured epoxy material 70 also flows into the circumferential grooves 30 and permeates between the wires in coils 44.

The bonding material 70 in the stator assembly is then suitably cured such as by an air curing process or a heat treatment process that will not impair any of the properties of the other insulating materials.

The final step in the construction of the stator assembly is to form an armature bore 80 of a preselected radius B in the center of the stator assembly such that the cylindrical core portion 20 of radius C, shown in FIG. 2, is completely removed. Thus the radius B of the bore 80 is greater than radius C of the core portion 20. FIG. 3 shows the armature bore 80 after the cylindrical core portion 20 has been removed. As previously mentioned some of the electrically insulating material 34 in the circumferential grooves 30 may be machined away without damaging any of the wires of the coil 44. This insures that all the metal is removed between the coil 44 and the armature bore 80 such that the armature will reciprocate in electromagnetic communication with the coils 44. An end view of the stator assembly in FIG. 4 shows that each radially tapered lamination 16 is separated from each adjacent laminations by the cured bonding material in the radial slots 14. The stator shell 50 holds all of the laminations 16 in radially inward compression at their outer edges. The laminations 16 are held in circumferential compression and alignment at their inner edges similar to the keystone effect of an archway. The stator shell 50 also serves as the path for the magnetic flux produced around the coil 44 and as part of an airtight casing for hermetic sealing for such applications as a linear compressor.

In accordance with this invention, a cylindrical laminated stator assembly which is simple, precise and reliable and which is particularly advantageous for a miniature electrodynamic device, has been described. Cylindrical laminated stators are desirable to minimize the eddy current losses and to provide a more efficient stator for use in linear electromagnetic machines such as motors, actuators or alternators.

Also a new method has been set forth which simply, precisely, economically and reliably provides for making the stator, which is particularly advantageous for making miniature devices such as those having bores less than 0.5 inch.

Obviously, numerous modifications and variations of the disclosed embodiment are possible in light of this disclosure. For example, electrically insulating the grooves and slots could be provided in many other different ways, such as by spraying or coating. The bonding material could also be a thermal setting powder. Other modifications will occur to those skilled in the art and it is most expressly to be understood that these modifications and their equivalent may be practiced while remaining in the spirit and scope of the invention defined in the following claims.

What is claimed is:

1. A method of making a laminated stator for a linear electrodynamic machine comprising the steps of:
   providing a cylindrical stator member of magnetic material defined by a cylinder of a predetermined radius;

forming a plurality of uniformly spaced, axially extending radial slots in said stator member each being of uniform width and of a first preselected radial depth which is less than said predetermined radius to form radially tapered laminations which remain joined together at their radially inward ends by a cylindrical core portion;

forming a plurality of uniformly spaced circumferential grooves of a second preselected radial depth and uniform cross section in the cylindrical stator member;

electrically insulating on all the surfaces of the circumferential grooves;

electrically insulating all the surfaces of a preselected one of the axially extending radial slots to form an insulated wireway extending between the ends of the cylindrical stator member;

winding a plurality of turns of a continuous wire in each of the circumferential grooves to form toroid-shaped coils therein such that the continuous wire is passed in sequence to each adjacent circumferential groove through the insulated wireway;

providing a cylindrical stator shell of magnetic material and having an inner dimension adapted to fit tightly over the stator member outer periphery to form a stator assembly and having on the inner dimension surface axially extending radial slots of the same spacing as the radial slots on the stator member;

introducing an uncured bonding material into all the voids in the stator assembly;

curing the bonding material in the stator assembly; and forming a bore of a preselected radius in the stator assembly such that the core portion is completely removed and the radially tapered laminations are separated from the adjacent laminations by cured bonding material and held in radial compression by the cylindrical stator shell.

2. A method of making a laminated stator as set forth in claim 1, further comprising the steps of:

providing a second layer of electrically insulating material in the wireway to insulate the end portion of the continuous wire as it is passed from the last circumferential groove back through the wireway to a position near the start portion of the continuous wire for connection of both to an energy source.

3. A method of making a laminated stator as set forth in claim 2, further comprising the steps of:

sealing the ends of the stator assembly with gas tight seals;

evacuating the stator assembly; and introducing the uncured bonding material into the voids by drawing it into the vacuum created in the stator assembly.

* * * * *